US007369195B2

(12) United States Patent
Wu et al.

(10) Patent No.: US 7,369,195 B2
(45) Date of Patent: May 6, 2008

(54) COLOR FILTER AND LIQUID CRYSTAL DISPLAY USING THE SAME

(75) Inventors: Mei Ling Wu, Miao-Li (TW); Sheng-Shiou Yeh, Miao-Li (TW); Jia-Pang Pang, Miao-Li (TW)

(73) Assignee: Innolux Display Corp., Miao-Li County (TW)

(*) Notice: Subject to any disclaimer, the term of this patent is extended or adjusted under 35 U.S.C. 154(b) by 377 days.

(21) Appl. No.: 11/111,597

(22) Filed: Apr. 20, 2005

(65) Prior Publication Data

US 2005/0237449 A1 Oct. 27, 2005

(30) Foreign Application Priority Data

Apr. 23, 2004 (TW) .............................. 93111369 A

(51) Int. Cl.
*G02F 1/1335* (2006.01)

(52) U.S. Cl. ...................................................... 349/106

(58) Field of Classification Search ................. 349/106
See application file for complete search history.

(56) References Cited

U.S. PATENT DOCUMENTS

| | | | | |
|---|---|---|---|---|
| 5,144,288 | A | 9/1992 | Hamada et al. | |
| 5,216,414 | A | 6/1993 | Fukutani et al. | |
| 7,139,049 | B2 * | 11/2006 | Yoshida | 349/106 |
| 2004/0021807 | A1 * | 2/2004 | Narutaki et al. | 349/106 |
| 2004/0085495 | A1 * | 5/2004 | Roh et al. | 349/106 |

* cited by examiner

*Primary Examiner*—David Nelms
*Assistant Examiner*—Richard H Kim
(74) *Attorney, Agent, or Firm*—Wei Te Chung

(57) ABSTRACT

A color filter includes a plurality of pixels, each of which includes a red, a green, and a blue sub-pixel alternately arranged in a first direction, edges of the red, green, and blue sub-pixels having bent portions. The sub-pixels of a same color are continuously arranged in a second direction being substantially perpendicular to the first direction. Displaying color images of a liquid crystal display using the color filter may be better than that of the liquid crystal display using the typical color filters. The yield ratio in mass production of the liquid crystal display using the color filter is lower than that of the liquid crystal display using the typical color filters. In addition, a liquid crystal display using the color filter is disclosed.

5 Claims, 4 Drawing Sheets

100
IV
101
R G B R G B
R G B R G B
R G B R G B
R G B R G B
Y
X

3

III

| R | G | B | R | G | B |
|---|---|---|---|---|---|
| B | R | G | B | R | G |
| G | B | R | G | B | R |
| R | G | B | R | G | B |

COLOR FILTER AND LIQUID CRYSTAL DISPLAY USING THE SAME

FIELD OF THE INVENTION

The present invention relates to color filters and liquid crystal displays using color filters.

BACKGROUND

Liquid crystal displays are passive display devices. To display color images, a color filter needs to be provided. Referring to FIG. 4, a first kind of typical color filter 1 defines a plurality of pixels formed by arranging red (R), green (G), and blue (B) sub-pixels in a matrix. Each pixel includes a red sub-pixel, a green sub-pixel, and a blue sub-pixel. The structure of the color filter 1 is simple. However, in each of areas such as that shown within rectangular area I in FIG. 4, there is only one kind of sub-pixel. The area within rectangular area I has the same size as each of the pixels. Therefore, the capability of fine color mixing is poor, and a liquid crystal display using the color filter 1 tends to display poor quality color images.

Referring to FIG. 5, a second kind of typical color filter 2 includes a plurality of red (R), green (G), and blue (B) sub-pixels. The red, green and blue sub-pixels are arranged such that their centers define a regular, repeating array of equilateral triangles. Each of areas such as that shown within rectangular area II in FIG. 5 has a same size as the area within rectangular area I of the color filter 1. However, there are three kinds of sub-pixels in the area within rectangular area II. Accordingly, the quality of color images displayed by a liquid crystal display using the color filter 2 is better than that of the liquid crystal display using the color filter Referring to FIG. 6, part of a driving circuit of the liquid crystal display using the color filter 2 is shown. The driving circuit includes a plurality of gate lines 11 being parallel to each other, and a plurality of signal lines 12. The gate lines 11 are connected to gate electrodes of corresponding thin film transistors, and are driven by a driving integrated circuit (IC) 13. Each signal line 12 is connected to source electrodes of thin film transistors according to the same color sub-pixels, and is driven by a driver 14. Therefore the distribution of the signal lines 12 is complex, and the signal lines 12 are always configured with right-angled bends. However, disruption or cutoffs may easily occur at the right-angled bends of the signal lines 12. This tends to result in a low yield rate in mass production of the color filter 2.

Referring to FIG. 7, a third kind of typical color filter 3 includes a plurality of red (R), green (G), and blue (B) sub-pixels arranged in a regular, repeating mosaic. Each of areas such as that shown within rectangular area III in FIG. 5 has a same size as the area within rectangular area I of the color filter 1. However, there are three kinds of sub-pixels in the area within rectangular area III. Accordingly, the quality of color images displayed by a liquid crystal display using the color filter 3 is better than that of the liquid crystal display using the color filter 1.

Referring to FIG. 8, part of a driving circuit of the liquid crystal display using the color filter 3 is shown. Signal lines 15*r*, 15*g*, 15*b* are respectively connected to corresponding thin film transistors according to red, green, and blue sub-pixels. Therefore the distribution of the signal lines 15*r*, 15*g*, 15*b* is complex, and the signal lines 15*r*, 15*g*, 15*b* are always configured with right-angled bends. However, disruption or cutoffs may easily occur at the right-angled bends of the signal lines 15*r*, 15*g*, 15*b*. This tends to result in a low yield rate in mass production of the color filter 3.

What is needed is a color filter which can overcome the above-described problems.

SUMMARY

In one embodiment, a color filter includes a plurality of pixels, each of which includes a red, a green, and a blue sub-pixels arranged in a first direction, edges of the red, green, and blue sub-pixels having bent portions. The sub-pixels of a same color are continuously arranged in a second direction being substantially perpendicular to the first direction.

Because the edges of the red, green, and blue sub-pixels have bent portions, in a rectangular area including one or more the bent portions and having the same size as a pixel comprising a red sub-pixel, a green sub-pixel, and a blue sub-pixel, there are more color portions in the rectangular area than in the corresponding rectangular area of the typical color filters. Accordingly, the quality of color images displayed by a liquid crystal display using the color filter can be better than that of a liquid crystal display using a typical color filter.

Further, because of the color sub-pixels of a same color continuously arranged in the second direction being substantially perpendicular to the first direction, in a driving circuit of a liquid crystal display using the color filter, the thin film transistors corresponding to the same color sub-pixels are continuously arranged in the second direction. As a result, a distribution of signal lines connected to the thin film transistors can be simple, with signal lines not having any right-angled bends. Accordingly, the yield rate in mass production of the liquid crystal display using the color filter is higher than that of other liquid crystal displays using typical color filters described above.

Other objects, advantages, and novel features of embodiments of the present invention will become more apparent from the following detailed description when taken in conjunction with the accompanying drawings, in which:

DETAILED DESCRIPTION OF PREFERRED EMBODIMENTS

Figure 1:
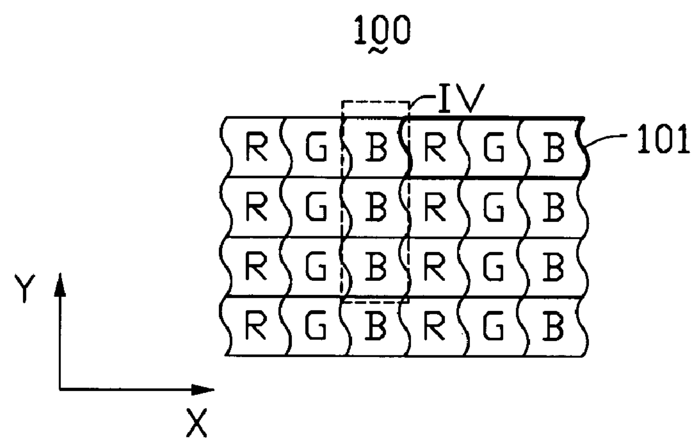
FIG. 1 is a schematic, top plan view of part of a color filter according to a first embodiment of the present invention.

Referring to FIG. 1, a color filter 100 according to a first embodiment of the present invention is formed by arranging red (R), green (G), and blue (B) sub-pixels in a matrix. The red, green, and blue sub-pixels are alternately arranged along a horizontal direction X, and the sub-pixels of a same color are continuously arranged along a vertical direction Y. The color filter 100 defines a plurality of pixels 101, each of which includes a red sub-pixel, a green sub-pixel and a blue sub-pixel. Edges of each of the red, green, and blue sub-pixels have one or more curved portions.

Each of areas, such as that shown within rectangular area IV in FIG. 1, has a same size as a pixel 101. The area within rectangular area IV includes one or more of the curved portions, so that there are three major color portions displaying blue continuously arranged in the vertical direction Y, and a plurality of secondary color portions displaying green and red. Therefore, there are more color portions in the area within rectangular area IV than in the corresponding area within rectangular area I of the typical color filter 1 described above. Accordingly, the quality of color images displayed by a liquid crystal display using the color filter 100 can be better than that of the liquid crystal display using the typical color filter 1.

When the amplitude of the curved portions is half of the width of rectangular area IV, the area aspect ratio of the major color portions and the secondary color portions in the area within rectangular area IV is 0.682:0.318. When the amplitude of the curved portions is the same as the width of rectangular area IV, the area aspect ratio of the major color portions and the secondary color portions in the area within rectangular area IV is 0.363:0.637. Consequently, the greater the amplitude of the curved portions, the smaller the area aspect ratio of the major color portions and the secondary color portions. That is, the capability of fine color mixing is greater.

Figure 2:
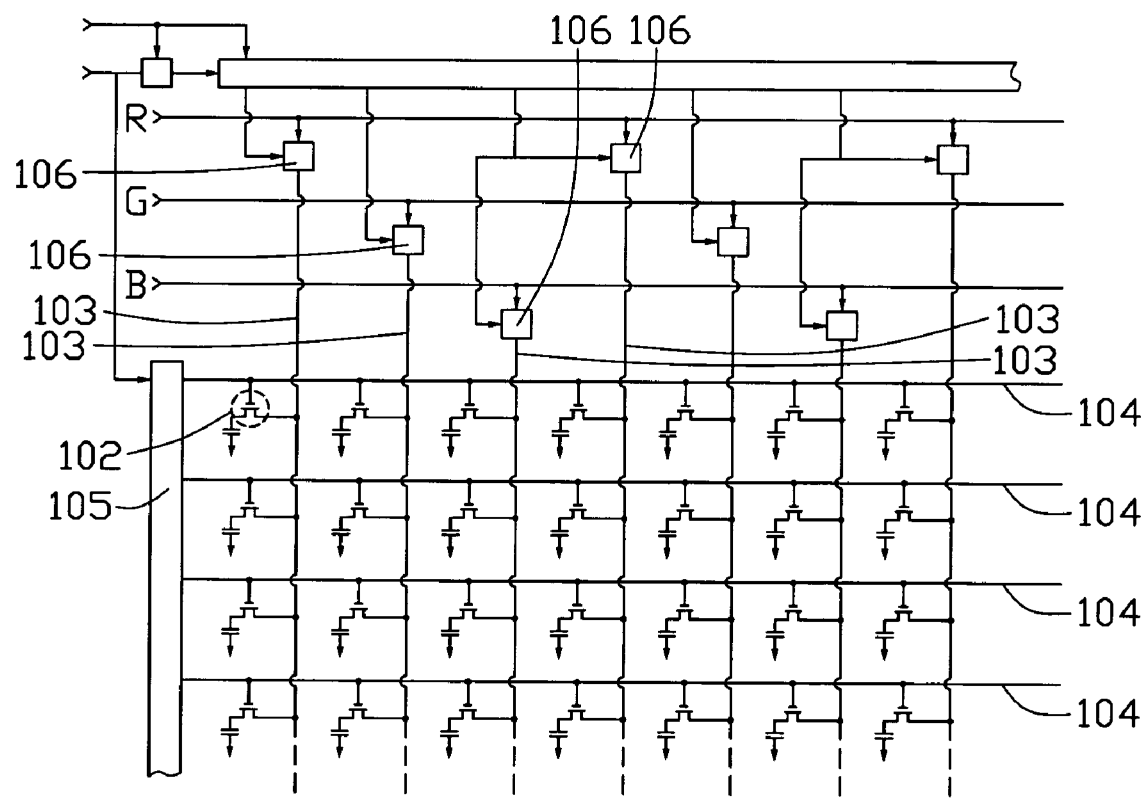
FIG. 2 is a schematic, top plan view of part of a driving circuit of a liquid crystal display using the color filter of the first embodiment.

Referring to FIG. 2, a driving circuit of the liquid crystal display using the color filter 100 is shown. The driving circuit includes a plurality of thin film transistors 102 corresponding to the red, green, and blue sub-pixels. Gate lines 105 are driven by a gate driver IC 104, and signal lines 106 are driven by a signal driver IC 103. Because same colored sub-pixels are continuously arranged along the vertical direction Y, the thin film transistors 102 corresponding to the same colored sub-pixels are also continuously arranged along the vertical direction Y. As a result, the distribution of signal lines 106 connected to the thin film transistors 102 can be simple, with the signal lines 106 not having any right-angled bends. Accordingly, the yield rate in mass production of the liquid crystal display using the color filter 100 is higher than that of the liquid crystal displays using the typical color filters 2 or 3 described above.

Figure 3:
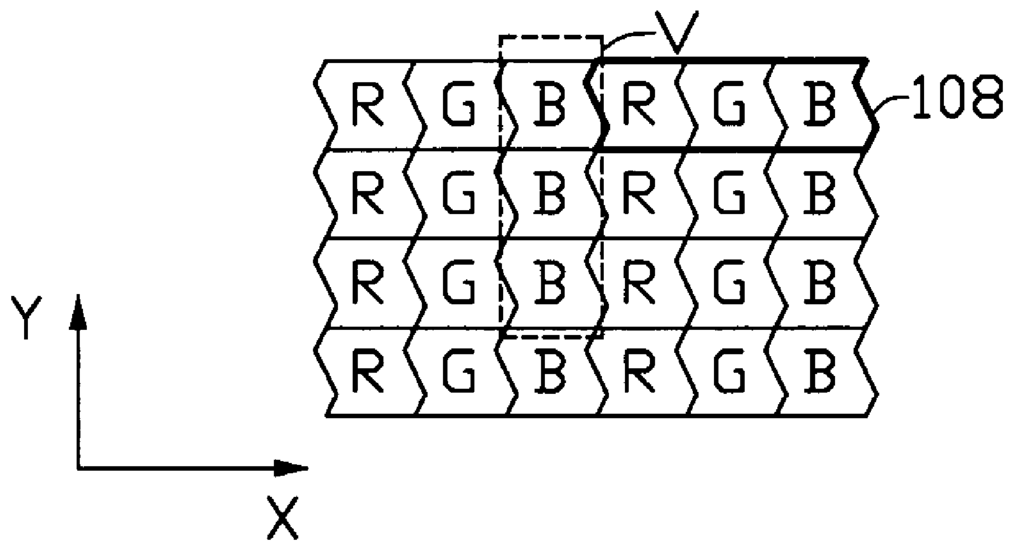
FIG. 3 is a schematic, top plan view of part of a color filter according to a second embodiment of the present invention.
Figure 4:
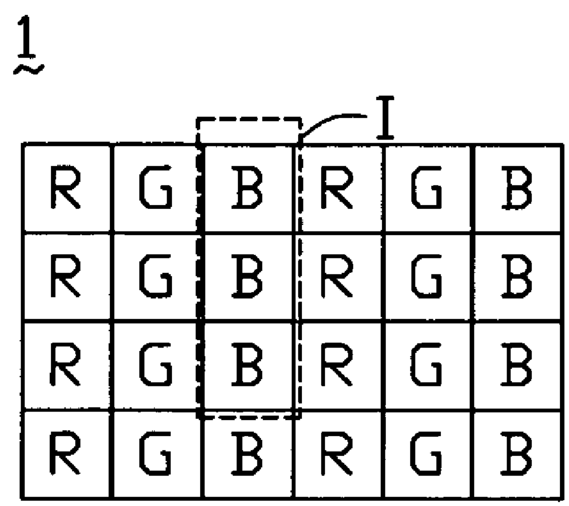
FIG. 4 is a schematic, top plan view of part of a first kind of typical color filter.
Figure 5:
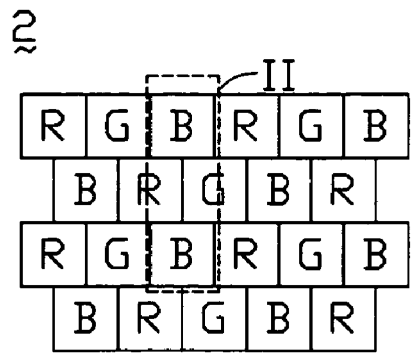
FIG. 5 is a schematic, top plan view of part of a second kind of typical color filter.
Figure 6:
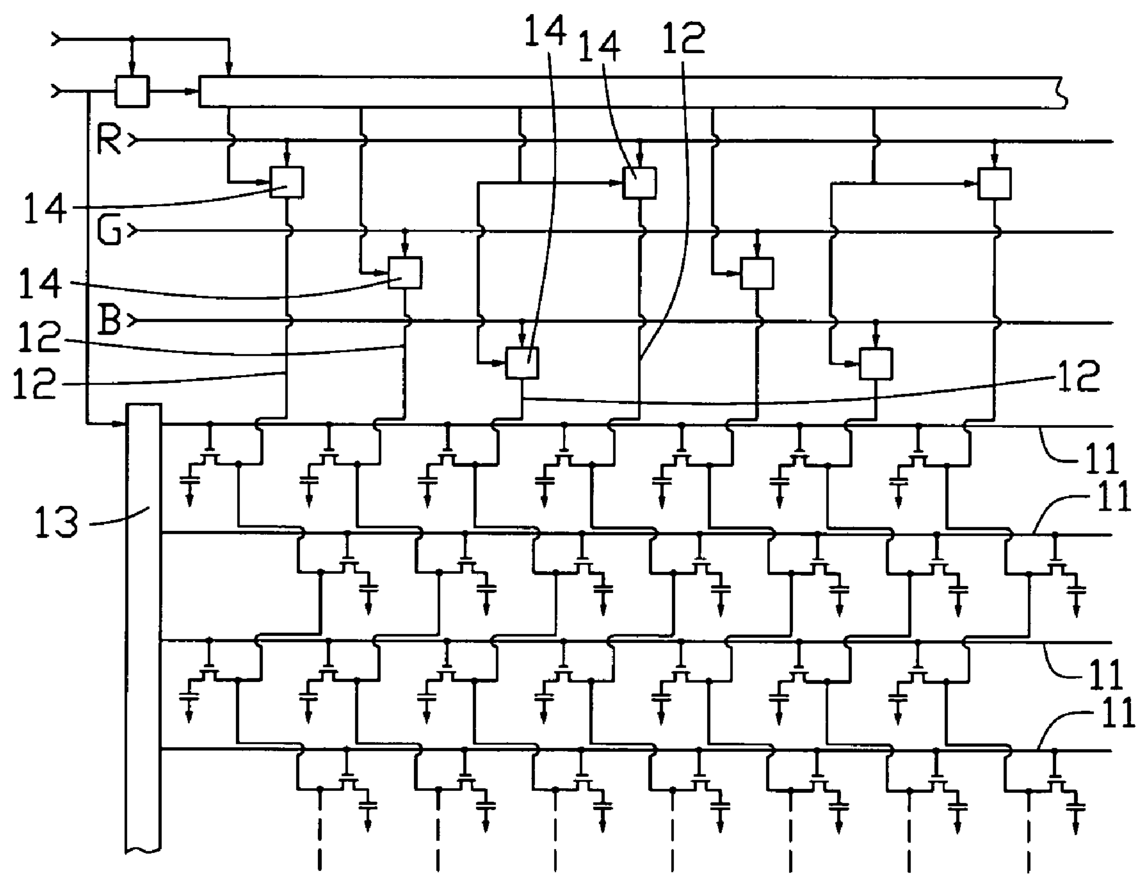
FIG. 6 is a schematic, top plan view of part of a driving circuit of a liquid crystal display using the second kind of typical color filter.
Figures 7, 8:
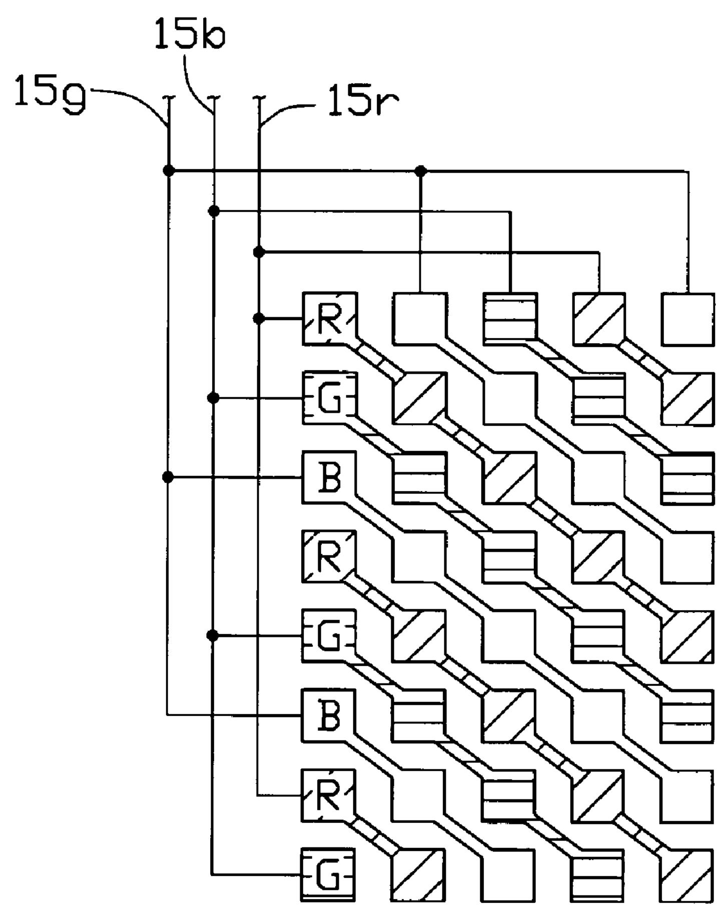
FIG. 7 is a schematic, top plan view of part of a third kind of typical color filter.
FIG. 8 is a schematic, top plan view of part of a driving circuit of a liquid crystal display using the third kind of typical color filter.

Referring to FIG. 3, a color filter 107 according to a second embodiment of the present invention is formed by arranging red (R), green (G), and blue (B) sub-pixels in a matrix. The red, green, and blue sub-pixels are alternatively arranged along a horizontal direction X, and the sub-pixels of a same color are continuously arranged along a vertical direction Y. The color filter 107 defines a plurality of pixels 108, each of which includes a red sub-pixel, a green sub-pixel and a blue sub-pixel. Edges of the red, green, and blue sub-pixels have one or more rectilinear bent portions. In the illustrated embodiment, the rectilinear bent portions form zigzagged shapes.

Each of areas such as that shown within rectangular area V in FIG. 3 has a same size as a pixel 108. The area within rectangular area V includes one or more of the bent portions, so that there are three major color portions displaying blue continuously arranged in the vertical direction Y, and a plurality of secondary color portions displaying green and red. Therefore, there are more color portions in the area within rectangular area V than in the corresponding area within rectangular area I of the typical color filter 1 described above. Accordingly, the quality of color images displayed by a liquid crystal display using the color filter 107 can be better than that of the liquid crystal display using the typical color filter 1. Further, for reasons similar to those described above in relation to the color filter 100, the yield rate in mass production of the liquid crystal display using the color filter 107 is higher than that of the liquid crystal displays using the typical color filters 2 or 3 described above.

When the amplitude of the rectilinear bent portions is half of the width of rectangular area V, the area aspect ratio of the major color portions and the secondary color portions in the area within rectangular area V is 0.75:0.25. When the amplitude of the rectilinear bent portions is the same as the width of rectangular area V, the area aspect ratio of the major color portions and the secondary color portions in the area within rectangular area V is 0.5:0.5. Consequently, the greater the amplitude of the rectilinear bent portions, the smaller the area aspect ratio of the major color portions and the secondary color portions. That is, the capability of fine color mixing is greater.

In alternative embodiments, the red, green, and blue sub-pixels of the color filter 100 or the color filter 107 may be arranged such that their centers define a regular, repeating array of equilateral triangles, or may be arranged in a regular, repeating mosaic. In a liquid crystal display using any of the above-described color filters or another filter according to the present invention, the liquid crystal display generally includes a first substrate and a second substrate. A liquid crystal layer is sandwiched between the first and second substrates, and the color filter is arranged on or at one of the first and second substrates.

It is to be further understood that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A color filter, comprising a plurality of pixels, each pixel comprising a red, a green, and a blue sub-pixel alternately arranged in a first direction, the color filter defining a rectangular area comprising three major portions of sub-pixels of a same color continuously arranged in a second direction being substantially perpendicular to the first direction, and a plurality of secondary portions of sub-pixels of a color or colors other than said same color wherein an area aspect ratio of the major portions and the secondary portions in the rectangular area is 0.682:0.318.

2. A liquid crystal display, comprising:

a first substrate and a second substrate, and a liquid crystal layer sandwiched between the first and second substrates; and a color filter, comprising a plurality of pixels, each pixel comprising a red, a green, and a blue sub-pixel alternately arranged in a first direction, the color filter defining a rectangular area comprising three major portions of sub-pixels of a same color continuously arranged in a second direction being substantially perpendicular to the first direction, and a plurality of secondary portions of sub-pixels of a color or colors other than said same color, wherein an area aspect ratio of the major portions and the secondary portions in the rectangular area is 0.682: 0.318.

3. The liquid crystal display as claimed in claim 2, wherein the sub-pixels of a same are continuously arranged in a second direction being substantially perpendicular to the first direction, said oblique portions being oblique to said second direction.

4. The liquid crystal display as claimed in claim 2, wherein some or all of the edges of the plurality of secondary portions are curved.

5. The liquid crystal display as claimed in claim 2, wherein some or all of the bent portion are rectilinear.

* * * * *